United States Patent
Fan et al.

(10) Patent No.: US 8,500,026 B2
(45) Date of Patent: Aug. 6, 2013

(54) DUAL RESOLUTION TWO-DIMENSIONAL BARCODE

(75) Inventors: Zhigang Fan, Webster, NY (US); Yonghui Zhao, Pensfield, NY (US); Shen-ge Wang, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 13 days.

(21) Appl. No.: 13/312,386

(22) Filed: Dec. 6, 2011

(65) Prior Publication Data

US 2013/0140354 A1 Jun. 6, 2013

(51) Int. Cl.
*G06K 7/12* (2006.01)

(52) U.S. Cl.
USPC ........................................................ 235/469

(58) Field of Classification Search
USPC .................. 235/462.01, 462.06, 462.09, 469, 235/494
See application file for complete search history.

(56) References Cited

U.S. PATENT DOCUMENTS

| | | | | |
|---|---|---|---|---|
| 8,079,525 | B1* | 12/2011 | Zolotov | 235/469 |
| 2010/0131368 | A1* | 5/2010 | Morris et al. | 705/14.65 |
| 2011/0290879 | A1* | 12/2011 | Guo et al. | 235/437 |

* cited by examiner

*Primary Examiner* — Seung Lee
(74) *Attorney, Agent, or Firm* — Fox Rothschild LLP

(57) ABSTRACT

A grayscale two-dimensional barcode may be converted to a two-dimensional color barcode. The color barcode includes a set of sub-regions, and the cells in each sub-region exhibits a color pattern that corresponds to pattern of binary, grayscale cells. The two-dimensional color barcode may be decoded by comparing the pattern for each sub-region to a known grayscale pattern. The two-dimensional color barcode may be used for error correction by first decoding the barcode in grayscale form based on the luminance without reference to color, then decoding the barcode based on its color and comparing the results.

17 Claims, 8 Drawing Sheets
(2 of 8 Drawing Sheet(s) Filed in Color)

DUAL RESOLUTION TWO-DIMENSIONAL BARCODE

BACKGROUND

Two-dimensional (2D) barcodes and other symbologies, have become a widely accepted tool for sharing small amounts of data, and for tracking objects that are marked with the barcode. A two-dimensional barcode is an example of a symbology. Other examples of symbologies include Universal Product Codes (UPC), data matrix codes, Quick Response (QR) codes, Aztec code symbols, Maxi code and the like.

When a user uses a camera and barcode scanner to scan a barcode, the user can have difficulty obtaining an accurate picture. In addition, most QR codes have an area of about 2 cm×2 cm. However, it is sometimes desirable to use smaller barcodes, such as those having an area of about 0.75 cm×0.75 cm. Such codes are used on small packages and in other applications. Blurring of the image and/or optical limitations of the camera can make it difficult to capture minute details of a two-dimensional barcode.

This document describes systems and methods that provide solutions to some or all of the problems described above, and that may provide additional benefits.

SUMMARY

In an embodiment, a barcode generation method may include using a processor generate a representation of a two-dimensional grayscale barcode image. The image may include a set of cells, and each cell exhibits a luminance. The processor, divides the image into a set of sub-regions, wherein each sub-region includes multiple cells. For each sub-region, the processor identifies cells that exhibit a first luminance and determines a positional pattern. For each sub-region, based on the sub-region's luminance characteristics and positional pattern, the processor assigns a color value. The processor then generates a two-dimensional color barcode so that each sub-region exhibits a color that corresponds to its assigned color value. The two-dimensional color barcode may be printed by a printing device, or displayed on a display, so that at least a portion of each sub-region appears with a color that is based on its assigned color value.

Optionally, when identifying cells in a sub-region that exhibit a first luminance and determining a positional pattern, the processor may identify a luminance value for each cell in the sub-region, determine a set of cells whose luminance value equals or is within a threshold range from the first luminance value, and assign the first luminance to each cell in the set. For each cell in the set to which the first luminance is assigned, the processor may determine a cell position within the sub-region. When assigning a color value, the processor may determine a color scheme based on the number and positions of the cells in the set. Determining a color scheme may include assigning a first saturation to each cell that exhibits the first luminance and assigning a second saturation to each cell in the sub-region to each cell that does not exhibit the first luminance.

In another embodiment, an electronic device containing an imaging device, a processor and a memory may implement a method of decoding a two-dimensional barcode. The imaging device may capture an image of a two-dimensional color barcode, wherein the barcode includes a set of cells that exhibit a set of colors. The processor may decode the two-dimensional barcode by determining a luminance value for each cell in the barcode and assigning a first binary value to each cell based on its luminance value. The processor may then divide the image into a set of sub-regions, wherein each sub-region comprises a group of the cells, and then determine a color and for each sub-region. The processor may determine a set of second binary values for each cell in each sub-region based on its sub-region's color, compare the set of second binary values for each cell in a set of the cells with the first binary value for each cell in the set, and determine whether the second binary values and the first binary values sufficiently match. If so, the processor may decoding the two-dimensional barcode to yield data and cause the device to implement an action based on the data. If a perfect match does not appear, the processor may select a result that is closest to the match, and decode the two-dimensional barcode using the selected result. It will then causing the implementing an action based on decoded data.

For each sub-region, determining the luminance value for each cell may include identifying a luminance. If the identified luminance is within a first range from a lower value, the processor may determine the luminance value to be the lower value. If the identified luminance is within a second range from an upper value, the processor may determine the luminance value to be the upper value.

BRIEF DESCRIPTION OF THE FIGURES

This patent or application file contains at least one drawing executed in color. Copies of this patent or patent application publication with color drawings will be provided by the Office upon request and payment of the necessary fee.

DETAILED DESCRIPTION

Figure 1:
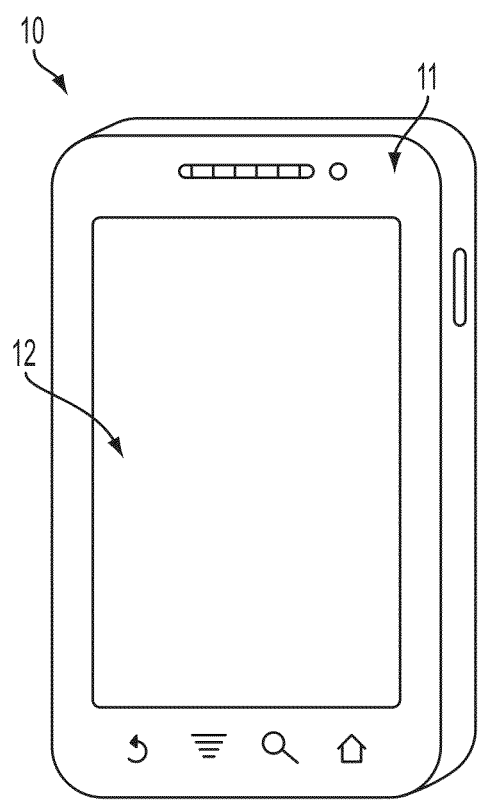
FIG. 1 is a front view of an example of an electronic device that may be used to read a symbology such a 2D barcode.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In this document, the term "data" refers to physical signals that indicate or include information. An "image," as a pattern of physical light or a collection of data representing the physical light, may include characters, words, barcodes and text as well as other features such as graphics. A "digital image" is by extension an image represented by a collection of digital data. In a digital image, each element of data may be called a "pixel", which is common usage in the art and refers to a picture element. A "cell" is a set of one or more pixels. Each pixel has a location and a value. Each pixel value is a bit in a "binary form" of an image. Each pixel exhibits a luminance, and a luminance value may be assigned to each pixel. For example, in a grayscale image (sometimes referred to in this document as "gray scale form"), each pixel may be assigned a luminance value between zero (representing black) and 255 (representing white). Each luminance value between zero and 255 represents a shade between black and white, with those at the lower end of the scale being darker and those at the higher end of the scale being lighter. In some embodiments, a digital image may include a set of color space coordinates in a "color coordinate form" of an image. The binary form, gray scale form, and color coordinate form are each a two-dimensional array defining an image.

An operation performs "image processing" when it operates on an item of data that relates to part of an image. "Contrast" is used to denote the visual difference between items, data points, and the like. It can be measured as a color difference or as a luminance difference or both. A digital color printing system is an apparatus arrangement suited to accepting image data and rendering that image data upon a substrate.

The term "color" refers to visual sensation of color stimulus, or the perception of color. In measurement terms, this refers to the colorimetric value as opposed to spectral reflectance. When printed on a substrate or displayed on a display, the color of any pixel may be formed by a combination of C, M, Y, K, primaries (cyan, magenta, yellow, and black). It is to be understood, however, that more than four colorants can be used in printing and these cases are explicitly included in the scope of the discussion below.

An "electronic device" refers to a device that includes an imaging device, a processor and tangible, computer-readable memory. The memory may contain programming instructions in the form of a software application that, when executed by the processor, causes the device to perform one or more barcode scanning operations according to the programming instructions. Examples of suitable devices include portable electronic devices such as smartphones, personal digital assistants, cameras, tablet devices, electronic readers, personal computers, media players, satellite navigation devices and the like.

An "imaging device" refers to any device capable of optically viewing an object and converting an interpretation of that object into electronic signals. One such example of an imaging device is a camera lens. An "image capture module" refers to the software application and/or the image sensing hardware of an electronic device that is used to capture images of symbology such as 2D barcodes and the like.

A "printer" or "printing device" is an item of equipment that can receive a data file or set of electronic instructions and impart alphanumeric text, symbols and/or graphics on a substrate based on the information contained in the data file or instructions. A printer may be a toner-based printer, a liquid ink jet printer, a solid ink printer, a dye-sublimation printer, an inkless printer, or another type of printer. A printing device also may be able to perform one or more additional print-related functions, such as scanning, copying, collating or binding. In such a situation, the print device may sometimes be referred to as a "multifunction device."

For the purposes of this document, a "symbology" is a system of symbols that may be arranged in any manner upon a surface. The symbology may include, but is not limited to, one-dimensional barcodes, two-dimensional barcodes, or three-dimensional barcodes, and may be an optical, machine-readable representation of data. The symbology may be of any geometric shape or size. Examples of one-dimensional barcodes include Universal Product Code (UPC) symbols and the like. Examples of two-dimensional barcodes include data matrix codes, quick response (QR) codes, Aztec codes, Maxi codes and the like. The symbology may be printed on a substrate or displayed on an electronic display.

FIG. 1 shows one example of an electronic device 10. The electronic device 10 may include a front face 11 and a display 12. The display 12 may be any suitable component for displaying images, including, but not limited to, an electroluminescent display, an electronic paper display, a vacuum fluorescent display, a light emitting diode (LED) display, a cathode ray tube (CRT) display, a liquid crystal (LCD) display, a plasma display panel, a digital light processing (DLP) display, and an organic light-emitting diode (OLED) display. The display 12 may also include a touch sensitive screen, including, but not limited to, resistive touchscreens, capacitive touchscreens, and infrared touchscreens.

Figure 2:
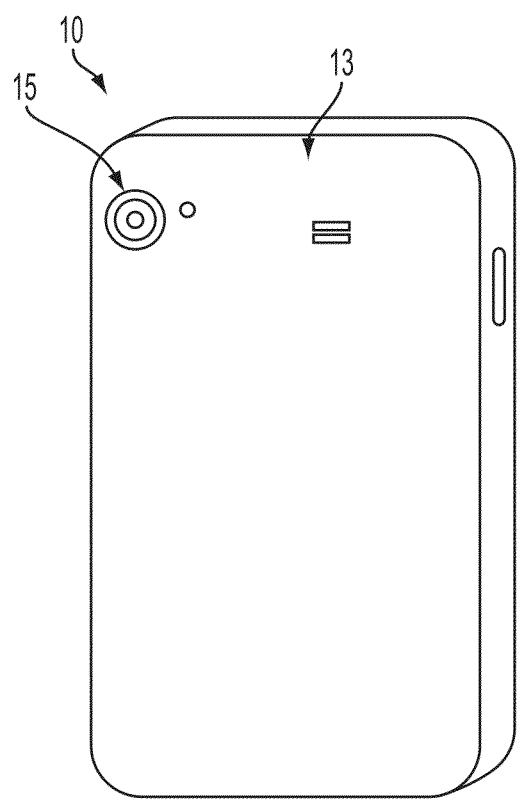
FIG. 2 is a rear view of an the electronic device of FIG. 1.

FIG. 2 shows a rear face 13 of the electronic device 10. The rear face 13 may include an imaging device 15. The imaging device 15 may be any suitable component capable of receiving an optical image and transmitting the information to other components for processing. The imaging device may have an ability to adjust its focal length and aperture in such a manner that would allow it to zoom and properly focus upon an intended object to be imaged. This adjustment may define an optimal focal distance, or a range of distances in which the electronic device 10 may be properly positioned from the intended object to be imaged to achieve a clear image.

While the imaging device 15 is depicted on the rear face of the present example, persons skilled in the art will appreciate that the imaging device 15 may be positioned at any location upon any face of the electronic device 10, or may even be external to the electronic device 10 and connected by any means of electronic communication, including, but not limited to, physical cable communication such as universal serial bus (USB), wireless radio communication, wireless light communication, or near field communication technology.

In some embodiments, the display 12 may be positioned within the electronic device 10, and may be configured in such a way so as to display the output of the imaging device 15 in real time so that the user may view the display 12 and see the output of the imaging device 15 on the display.

Accordingly, the configuration of the electronic device 10 as shown in FIGS. 1 and 2 is only an example, and persons skilled in the art will appreciate other configurations that are able to achieve a similar overall result.

Figure 3:
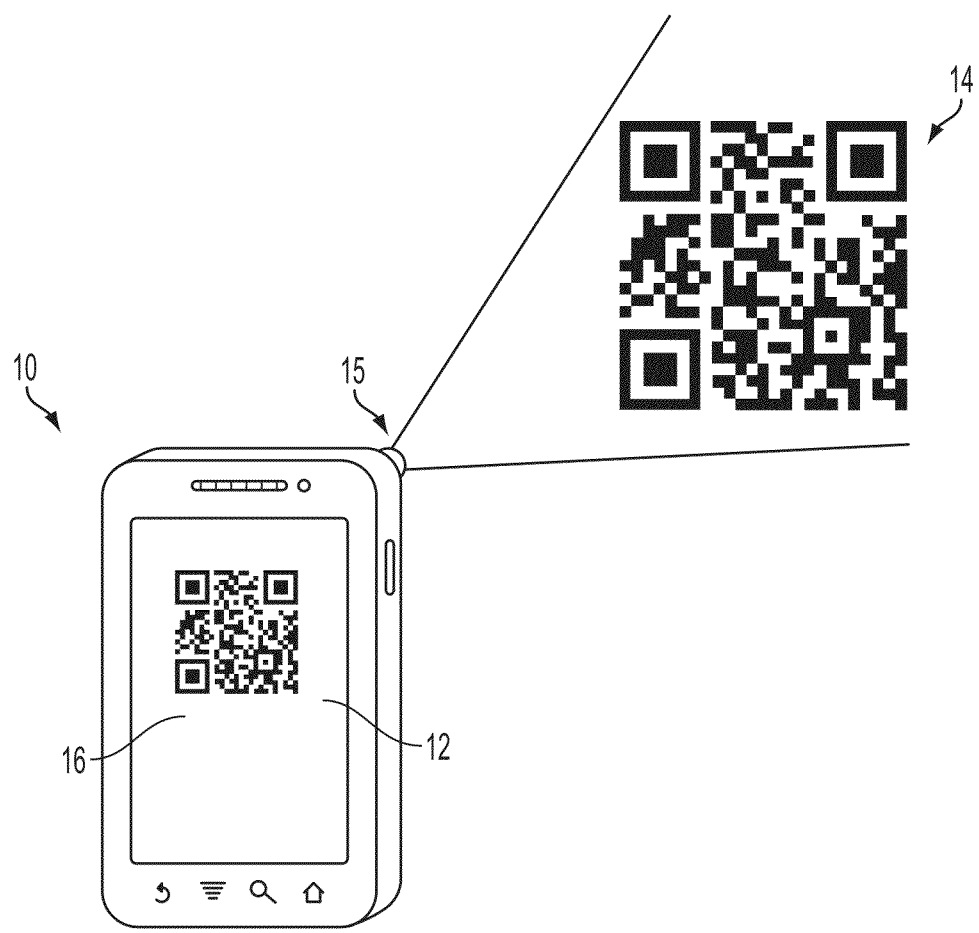
FIG. 3 illustrates how an electronic device may read a 2D barcode.

The electronic device 10 may be used to image a symbology 14, as shown in FIG. 3. The electronic device 10 may be positioned so that the imaging device 15 is facing the symbology 14 desired to be imaged. The imaging device 15 may be activated to view the symbology 14, wherein the electronic device 10 may process and transmit an image 16 depicting the symbology 14 upon the display 12 by use of an image capture module. The size and/or resolution of the image 16 on the display may be increased by moving the electronic device 10 closer to the symbology 14 and/or zooming the imaging device's lens in using a digital or optical zoom function. Similarly, the size of the image 16 may be decreased by moving the electronic device 10 farther away from the symbology 14 and/or decreasing the zoom of the imaging device 15.

An electronic device containing a processor and memory also may generate a two-dimensional barcode or other symbology. The processor may cause a display to output the symbology on the display, or it may cause a printing device to imprint the symbology on a substrate. In the embodiments described in this document, and with reference to FIG. 4, the memory may contain programming instructions in the form of an encoder that cause the processor to generate a 2D color barcode with a dual resolution structure 24 rather than, or based on, a black-and-white 2D barcode 14.

Figure 5:
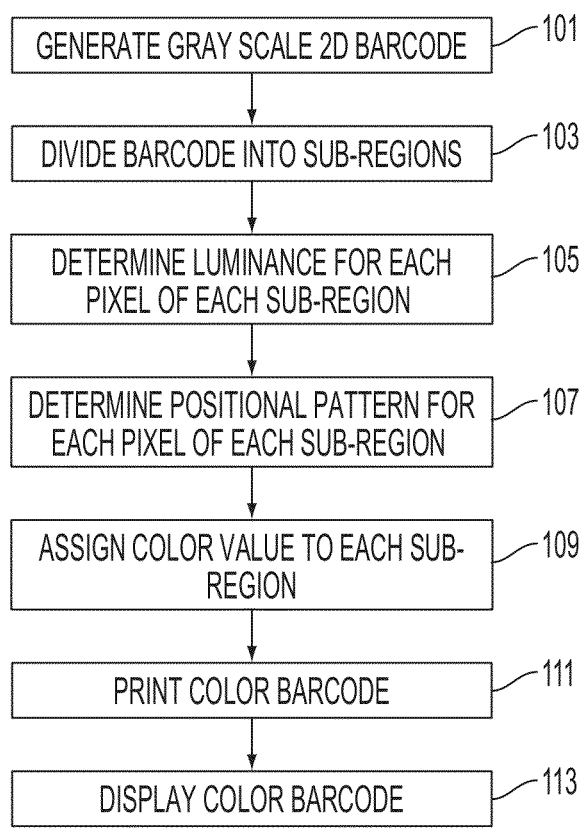
FIG. 5 illustrates an example of a dual resolution 2D barcode encoding process.

Referring to FIG. 5, the process of encoding a two-dimensional color barcode may include generating a representation of a two-dimensional, gray scale barcode image 101. The generating may be performed by using an electronic device to capture an image of a barcode and decode the barcode as shown in FIG. 3, or the generating may be done by encoding message data into a new barcode using any now or hereafter barcode encoding process. An example of an encoding process is disclosed in U.S. Pat. No. 5,946,414 to Cass et al., the disclosure of which is incorporated herein by reference in its entirety. The 2D barcode includes a matrix of cells and each cell may be composed of a matrix of pixels, and each pixel exhibits a luminance that corresponds to either black or white. Thus, the pixels together encode message data in binary form, with black representing 0 and white representing 1, or vice versa.

A printed or displayed pixel need not exhibit a luminance of zero to be considered black, nor must it exhibit a luminance of 255 to be considered white. Rather, all luminance levels at and/or below a first threshold may be considered to be black, while all luminance levels at and/or above a second threshold may be considered to be white. The first and second thresholds may be equal, or they may be different and thus result in a range between the thresholds that may be indeterminate.

The processor may divide the barcode into a set of sub-regions 103, wherein each sub-region comprises a subset of the cells of the barcode image. For example, each sub-region may include matrix of 2×2 cells. In this example, a barcode containing 60×60 cells may include up to 900 sub-regions. The barcode may be fully divided into sub-regions, or only a portion of the barcode may be divided into the sub-regions. Each sub-region is assigned a color 109. Each color value is determined based on the color and position of the grayscale pixels in its sub-region. For each sub-region, the processor determines which pixels exhibit a first luminance 105, and the positional pattern of those pixels 107. The first luminance may be black or white, and it may be an absolute value or a range of values (such as 0-127 representing black and 128-255 representing white). The processor may then cause the two-dimensional barcode to be displayed 111 on a display, or it may instruct a printing device to print 113 the barcode on a substrate, so that at least a portion of each sub-region is printed or displayed with a color representation that corresponds to its assigned color value.

Figure 6:
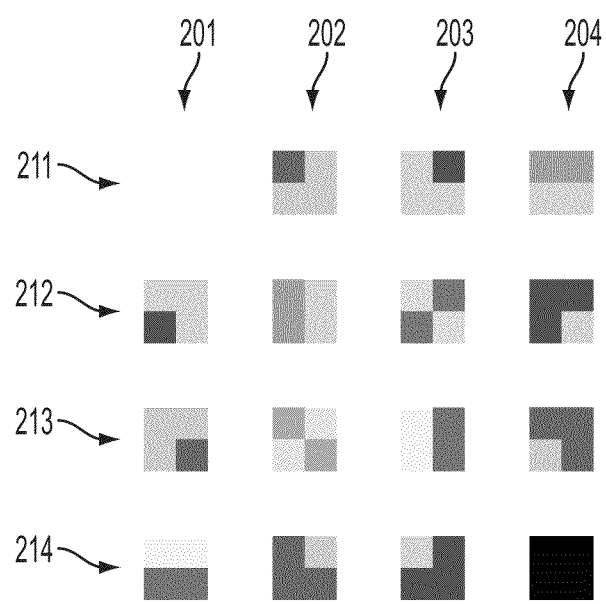
FIG. 6 is a color picture illustrates examples of how sub-regions may include color patterns that correspond to binary, grayscale cell patterns.

Each assigned color value will be determined by a unique combination of luminance values and positions for the grey-scale pixels in the sub-region. The color value may be a single value that corresponds to a solid color, or it may be a multiple values and one or more pattern indicators. Each color value may include a scheme (e.g., a single color or combination of colors) and/or a plurality of saturations (i.e., shades of at least one of the colors in the scheme). For example, continuing the example above of 2-cell-by-2-cell sub-regions and referring to FIG. 6:

a sub-region containing no black cells and all white cells may be encoded as four white cells (see column 201, row 211);

a sub-region containing only one black cell, positioned at the top left or bottom right, may be color-coded with color A (e.g. red), with the black cells encoded with a dark shade of red and the white cells encoded with a light shade of red (see column 202, row 211), a sub-region containing one black cell positioned at the top right or bottom left, with the remaining cells being white, may be color-coded with color B (e.g. blue), with the black cells encoded with a dark shade of blue and the white cells encoded with a light shade of blue (see column 203, row 211);

a sub-region containing two black cells in a left diagonal positional pattern, with the remaining cells being white, may be color-coded with color C (e.g. cyan), with the black cells encoded with a dark shade of cyan and the white cells encoded with a light shade of cyan (see column 201, row 213);

a sub-region containing two black cells in a right diagonal positional pattern, with the remaining cells being white, may be color-coded with color D (e.g. magenta), with the black cells encoded with a dark shade of magenta and the white cells encoded with a light or faint shade of magenta (see column 203, row 212);

a sub-region containing two black cells positioned at the left or top of the sub-region, with the remaining cells being white, may be color-coded with color E (e.g. green), with the black cells encoded with a bright shade of green and the white cells encoded with a light or faint shade of green (see column 204, row 211);

a sub-region containing two black cells positioned at the right or bottom of the sub-region, with the remaining cells being white, may be color-coded with color F (e.g. a combination of cream and khaki), with the black cells encoded with a khaki color and the white cells encoded a cream color (see column 201, row 214);

a sub-region containing one white cell positioned at the top left or bottom right, with the remaining cells being black, may be color-coded with color A (e.g. red), with the black cells encoded with a dark shade of red and the white cell encoded with a light shade of red (see column 203, row 213), a sub-region containing one white cell positioned at the top right or bottom left, with the remaining cells being black, may be color-coded with color B (e.g. blue), with the black cells encoded with a dark shade of blue and the white cell encoded with a light shade of blue (see column 204 row 212, or column 203 row 204), a sub-region containing no white cells and all black cells may be encoded as four black cells (see column 204, row 214).

Figure 4:
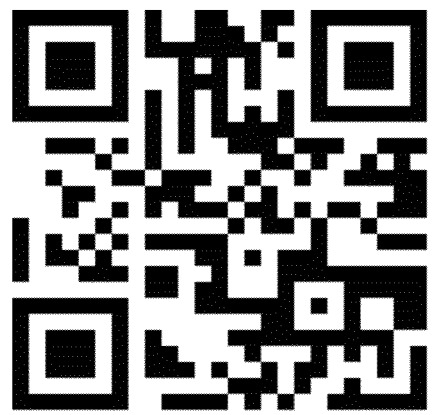
FIG. 4 illustrates examples of a grayscale 2D barcode and a dual resolution color barcode.
Figure 4:
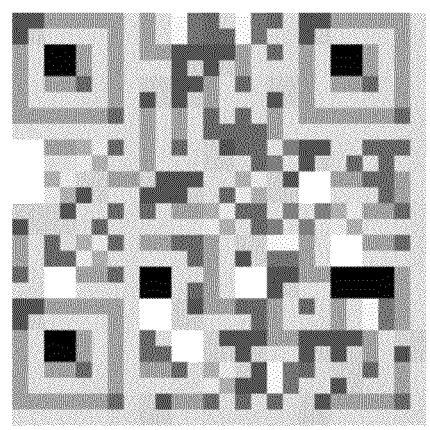

The color-coded barcode 24 of FIG. 4 may be exploited in any of several ways. For example, it may provide a dual-resolution function so that can be used in error-correction and to optimize binarization results. Binarization is the process of converting a grayscale bitmap into a binary pattern. Each pixel in the bitmap may be converted to a 0 or a 1 (black or white) depending on its grayscale value. However, in a grayscale bitmap, blurring may change gray levels and cause binarization errors.

Figure 7:
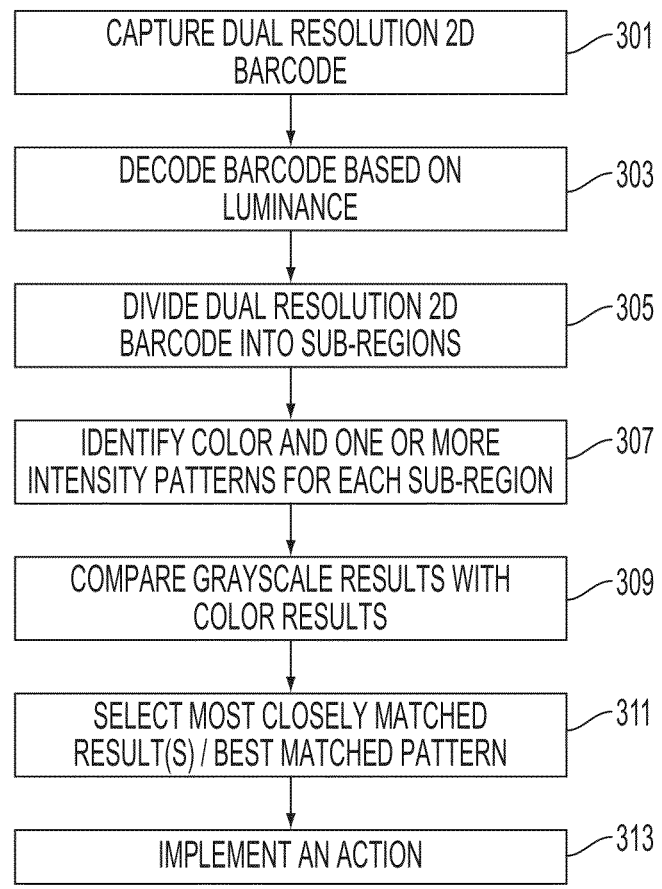
FIG. 7 illustrates an example of a dual resolution 2D barcode decoding process.

Accordingly, to decode a dual-resolution 2D barcode 24 such as that of FIG. 4, referring to FIG. 7 an electronic device may use an image sensor to capture an image of the barcode 301. Optionally, the device's processor may implement a barcode scanning application to decode the barcode 303 without reference to color by determining the luminance of each cell and assigning a binary value to each cell based on its luminance. The first luminance may be black or white, or it may be an absolute value or a range of values such as 0-127 representing black and 128-255 representing white. Optionally, all luminance levels at and/or below a first threshold may be considered to be black, while all luminance levels at and/or above a second threshold may be considered to be white.

The barcode scanning application may then implement error correction on the dual resolution barcode by dividing the barcode into a set of sub-regions 305, and identifying a color set of and one or more intensity patterns for each block based on a color for the cells within the sub-region 307. The patterns may be used to identify a set of corresponding black-and-white representations for each cell in the region and thus will assign a set binary values (one or zero, representing for example white or black) to each cell. The application may then compare the binary values determined for each cell based on the luminance assessment against the binary value set for each cell based on the color and intensity pattern 309.

If the comparison for any cells does not yield a match (i.e., if the result of the greyscale decoding of a pixel does not match any of the results of the dual resolution decoding), the system may select one of the results of the dual resolution coding that is the closest (best matched) to the result of the greyscale decoding 311. Alternatively, if the number of non-matching cells exceeds a threshold, the system may prompt the user to re-scan the barcode, or to take another action.

When the system determines that all or at least a threshold number or percentage of the pixels obtained in the greyscale decoding process and the color decoding process, the electronic device may implement an action 313 that is based on the decoded binary pattern. For example, the binary pattern may be further decoded by a commercially available barcode reader. Further actions may be taken based on the decoded data. For example, if the decoded data is a web address, the device may open a browser application and display a web page that corresponds to the web address. Alternatively, the decoded data may include an instruction to display text and/or graphics, play a media file, or take another action.

Figure 8:
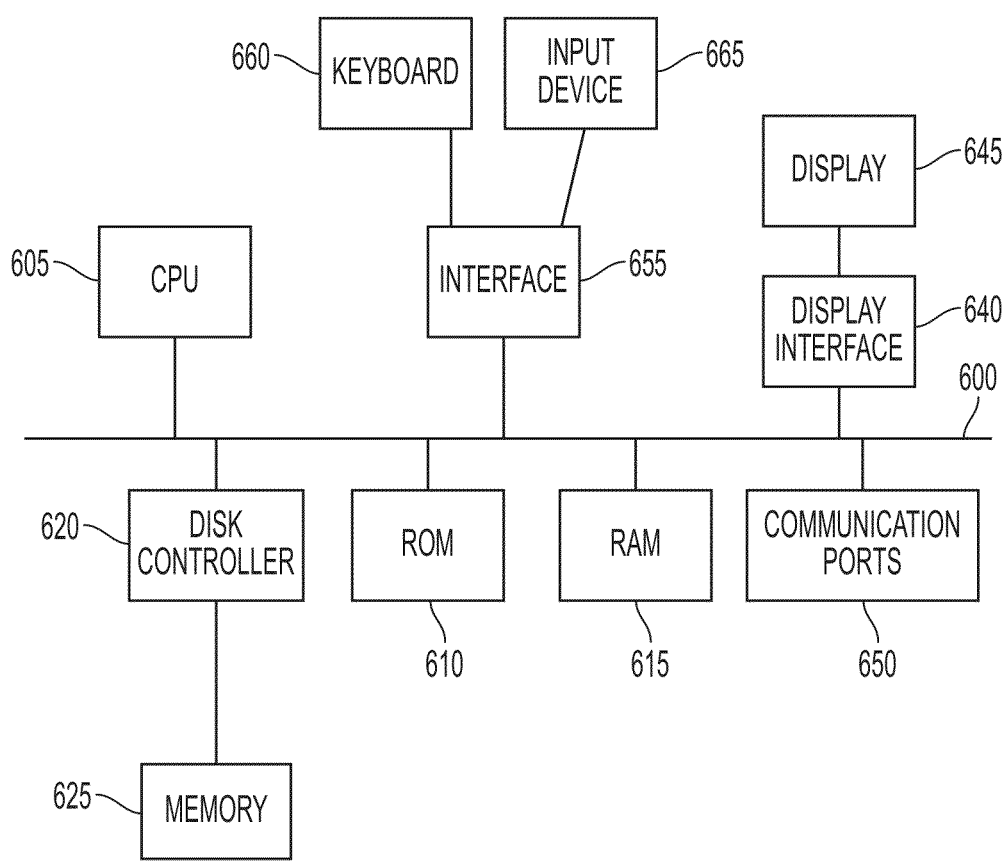
FIG. 8 is a block diagram showing elements of a computing device that may be used to generate a dual resolution barcode in accordance with various embodiments.

FIG. 8 depicts a block diagram of exemplary internal hardware that may be used to contain or implement program instructions, such as the process steps discussed above in reference to FIG. 5, according to embodiments. A bus 600 serves as the main information highway interconnecting the other illustrated components of the hardware. CPU 605 is the central processing unit of the system, performing calculations and logic operations required to execute a program. CPU 605, alone or in conjunction with one or more of the other elements disclosed in FIG. 8 is an exemplary processing device, computing device or processor as such terms are used within this disclosure. Read only memory (ROM) 610 and random access memory (RAM) 615 constitute exemplary memory devices or processor-readable storage media.

A controller 620 interfaces with one or more optional tangible, computer-readable memory devices 625 to the system bus 600. These memory devices 625 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 610 and/or the RAM 615. Optionally, the program instructions may be stored on a tangible computer readable medium such as a compact disk, a digital disk, flash memory, a memory card, a USB drive, an optical disc storage medium, such as a Blu-Ray™ disc, and/or other recording medium.

An optional display interface 630 may permit information from the bus 600 to be displayed on the display 435 in audio, visual, graphic or alphanumeric format. Communication with external devices, such as a printing device, may occur using various communication ports 440. An exemplary communication port 440 may be attached to a communications network, such as the Internet or an intranet.

The hardware may also include an interface 445 which allows for receipt of data from input devices such as a keyboard 450 or other input device 455 such as a mouse, a joystick, a touch screen, a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method, comprising:
by a processor, generating a representation of a two-dimensional grayscale barcode image, wherein the image comprises a plurality of cells and each cell exhibits a luminance;
by the processor, dividing the image into a plurality of sub-regions, wherein each sub-region comprises a plurality of the cells;
by the processor for each sub-region, identifying cells that exhibit a first luminance, and determining a positional pattern for the sub-region;
by the processor, for each sub-region, based on the cells that exhibit a first luminance and the positional pattern, assigning a color value; and
by the processor, for each sub-region, generating a two-dimensional color barcode so that each sub-region exhibits a color that corresponds to its assigned color value.

2. The method of claim 1, further comprising printing, by a printing device, the two-dimensional color barcode on a substrate so that at least a portion of each sub-region is printed with a color that is based on its assigned color value.

3. The method of claim 1, further comprising outputting, by a display device, the two-dimensional color barcode so that at least a portion of each sub-region is printed with a color that is based on its assigned color value.

4. The method of claim 1 wherein, for each sub-region, the identifying cells that exhibit a first luminance and determining a positional pattern comprises:
for each cell in the sub-region, identifying a luminance value;
determining a set of cells whose luminance value equals or is within a threshold range from the first luminance value, and assigning the first luminance value to each cell in the set;
for each cell in the set to which the first luminance value is assigned, determining a cell position within the sub-region.

5. The method of claim 4 wherein, for each sub-region, the assigning a color value comprises determining a color scheme based on the number and positions of the cells in the set.

6. The method of claim 4 wherein, for each sub-region, the assigning a color value also comprises assigning a first saturation to each cell that exhibits the first luminance and assigning a second saturation to each cell in the sub-region to each cell that does not exhibit the first luminance.

7. The method of claim 1, wherein each sub-region comprises a matrix of at least 2×2 cells, and each of the cells comprises a plurality of pixels.

8. A method of decoding a two-dimensional barcode, comprising:
   receiving, by an imaging device, an image of a two-dimensional color barcode, wherein the barcode comprises a plurality of cells that exhibit a plurality of colors;
   by a processor of an electronic device, decoding the two-dimensional barcode by determining a luminance value for each cell in the barcode and assigning a first binary value to each cell based on its luminance value;
   by the processor, dividing the image into a plurality of sub-regions, wherein each sub-region comprises a plurality of the cells;
   by the processor, determining a color for each sub-region;
   by the processor, determining a set of second binary values for each cell in each sub-region based on its sub-region's color;
   by the processor, comparing the set of second binary values for each cell in a set of the cells with the first binary value for each cell in the set;
   decoding the two-dimensional barcode to yield data; and
   causing the electronic device to implement an action based on the data.

9. The method of claim 8, further comprising, by the processor based on the comparing, determining whether the second binary values and the first binary values match.

10. The method of claim 9, wherein if the processor determines that the second binary values and the first binary values do not match, then before causing the electronic device to implement the processor selects a set of best matched binary values and uses the selected set to best matched values in the decoding.

11. The method of claim 8, wherein the action comprises actuating a software application that is installed on the device based on the data, displaying the data, or playing a media file.

12. The method of claim 8, wherein for each sub-region, determining the luminance value for each cell comprises:
   identifying a luminance;
   if the identified luminance is within a first range from a lower value, determining the luminance value to be the lower value; and
   if the identified luminance is within a second range from an upper value, determining the luminance value to be the upper value.

13. An electronic device, comprising:
   an imaging device;
   a processor; and
   a memory containing application instructions that cause the processor to:
     receive an image of a two-dimensional color barcode, wherein the barcode comprises a plurality of cells that exhibit a plurality of colors;
     decode the two-dimensional barcode by determining a luminance value for each cell in the barcode and assigning a first binary value to each cell based on its luminance value;
     divide the image into a plurality of sub-regions, wherein each sub-region comprises a plurality of the cells;
     determine a color for each sub-region;
     determine a set of second binary values for each cell in each sub-region based on its sub-region's color;
     compare the set of second binary values for each cell in a set of the cells with the first binary value for each cell in the set; and
     decode the two-dimensional barcode to yield data;
     cause the electronic device to implement an action based on the data.

14. The device of claim 13, wherein the instructions also cause the processor to determine whether the second binary values and the first binary values match.

15. The device of claim 14, wherein if the processor determines that the second binary values and the first binary values do not match, then before causing the electronic device to implement the instructions cause the processor to select a set of best matched binary values and uses the selected set to best matched values in the decoding.

16. The device of claim 13, wherein the action comprises actuating a software application that is installed on the device based on the data, displaying the data, or playing a media file.

17. The device of claim 13, wherein for each sub-region, the instructions that cause the processor to determine the luminance value for each cell comprises instructions to:
   identify a luminance;
   if the identified luminance is within a first range from a lower value, determine the luminance value to be the lower value; and
   if the identified luminance is within a second range from an upper value, determine the luminance value to be the upper value.

* * * * *